(12) United States Patent
Wang et al.

(10) Patent No.: US 10,551,593 B2
(45) Date of Patent: Feb. 4, 2020

(54) OPTICAL LENS

(71) Applicant: Young Optics Inc., Hsinchu (TW)

(72) Inventors: Kuo-Chuan Wang, Hsinchu (TW);
Chen-Cheng Liao, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 616 days.

(21) Appl. No.: 15/093,762

(22) Filed: Apr. 8, 2016

(65) Prior Publication Data
US 2017/0293107 A1 Oct. 12, 2017

(51) Int. Cl.
*G02B 9/64* (2006.01)
*G02B 13/18* (2006.01)
*G02B 27/00* (2006.01)

(52) U.S. Cl.
CPC .............. *G02B 9/64* (2013.01); *G02B 13/18* (2013.01); *G02B 27/0025* (2013.01)

(58) Field of Classification Search
CPC ...... G02B 9/64; G02B 13/0045; G02B 13/18; G02B 27/0025
USPC .................................................. 359/708, 755
See application file for complete search history.

(56) References Cited

U.S. PATENT DOCUMENTS

| | | | |
|---|---|---|---|
| 2005/0068634 A1* | 3/2005 | Miyatake | G02B 13/18 359/676 |
| 2007/0139793 A1 | 6/2007 | Kawada | |
| 2009/0219631 A1* | 9/2009 | Ning | G02B 9/60 359/716 |
| 2010/0277816 A1 | 11/2010 | Kweon et al. | |
| 2012/0056978 A1 | 3/2012 | Abe et al. | |
| 2013/0114150 A1 | 5/2013 | Kwon | |
| 2014/0139931 A1* | 5/2014 | Kubota | G02B 9/62 359/689 |
| 2014/0293100 A1* | 10/2014 | Sasaya | G02B 13/0045 348/294 |
| 2015/0092100 A1* | 4/2015 | Chen | H04N 5/23212 348/349 |
| 2015/0226936 A1* | 8/2015 | Suzuki | G02B 13/04 359/708 |
| 2016/0109687 A1* | 4/2016 | Son | G02B 13/0045 348/294 |

FOREIGN PATENT DOCUMENTS

KR    20120076210    7/2012

* cited by examiner

*Primary Examiner* — William R Alexander
(74) *Attorney, Agent, or Firm* — JCIPRNET

(57) ABSTRACT

An optical lens including a first lens group and a second lens group is provided. The first lens group is arranged between a magnified side and a minified side. The first lens group includes a lens closest to the magnified side. A refractive power of the lens is negative, and at least one surface of the lens is an aspherical surface. The second lens group is arranged between the first lens group and the minified side. A distance between the first lens group and the second lens group is smaller than 0.7 millimeter. The optical lens is complied with conditions of $0.53 < EFL/IH < 0.7$, $FOV \geq 150$ degrees, and $F \leq 2.8$, where EFL is an effective focal length, IH is an image height on an imaging plane at the minified side, FOV is a maximum field of view, and F is f-number.

20 Claims, 8 Drawing Sheets

OPTICAL LENS

BACKGROUND OF THE INVENTION

Field of the Invention

The invention relates to an optical device, and particularly relates to an optical lens.

Description of Related Art

In recent years, along with development of technology, all kinds of demands for image capturing are gradually increasing. For example, the demands for lenses having a wide field of view (FOV), such as super wide-angle lenses or fisheye lenses, are gradually increasing in, for example, products of car lenses and security surveillance cameras. However, as FOV gradually increases, optical aberration are also rapidly generated, such that optical design of the lenses becomes more difficult. In order to abate the optical aberration, it is common to increase the number of lenses or adopt aspherical lenses in related arts. As a result, the manufacture of the lenses become more difficult, and thus the cost of the lenses is also increased. Therefore, how to fabricate a lens having the characteristics of a wide FOV, miniaturization, a low cost, a high resolution, a large aperture, a short total track length (TTL) and capable of providing good optical quality is an important issue for those technicians of the field.

SUMMARY OF THE INVENTION

The invention relates to an optical lens having a wide field of view (FOV) angle, a large aperture, a short total track length (TTL), and capable of providing good optical quality.

An embodiment of the invention provides an optical lens including a first lens group and a second lens group. The first lens group is arranged between a magnified side and a minified side. The first lens group includes a first lens, a second lens, a third lens and a fourth lens sequentially arranged from the magnified side to the minified side. The first lens is a lens of the first lens group closest to the magnified side. The first lens is a biconcave lens, and at least one surface of the first lens is an aspherical surface. The second lens group is arranged between the first lens group and the minified side. The second lens group includes a fifth lens, a sixth lens, and a seventh lens sequentially arranged from the magnified side to the minified side. The optical lens is complied with a condition of $0.53 < EFL/IH < 0.7$, where EFL is an effective focal length of the optical lens, and IH is an image height on an imaging plane of the optical lens at the minified side.

Another embodiment of the invention provides an optical lens including a first lens group and a second lens group. The first lens group is arranged between a magnified side and a minified side. The first lens group includes a first lens closest to the magnified side. A refractive power of the first lens is negative, and at least one surface of the first lens is an aspherical surface. The second lens group is arranged between the first lens group and the minified side. A distance between the first lens group and the second lens group is smaller than 0.7 millimeter. The optical lens is complied with conditions of $FOV \geq 150$ degrees and $F \leq 2.8$, where FOV is a maximum field of view of the optical lens, and F is f-number.

According to the above descriptions, in the embodiments of the invention, the design of the optical lens is complied with the predetermined conditions and standards, so that the optical lens has a FOV angle, a large aperture, a short TTL, and is capable of providing good optical quality.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention will now be described more fully with reference to the accompanying drawings, in which exemplary embodiments of the invention are shown. The terms used herein such as "above", "below", "front", "back", "left" and "right" are for the purpose of describing directions in the figures only and are not intended to be limiting of the invention.

Figure 1:
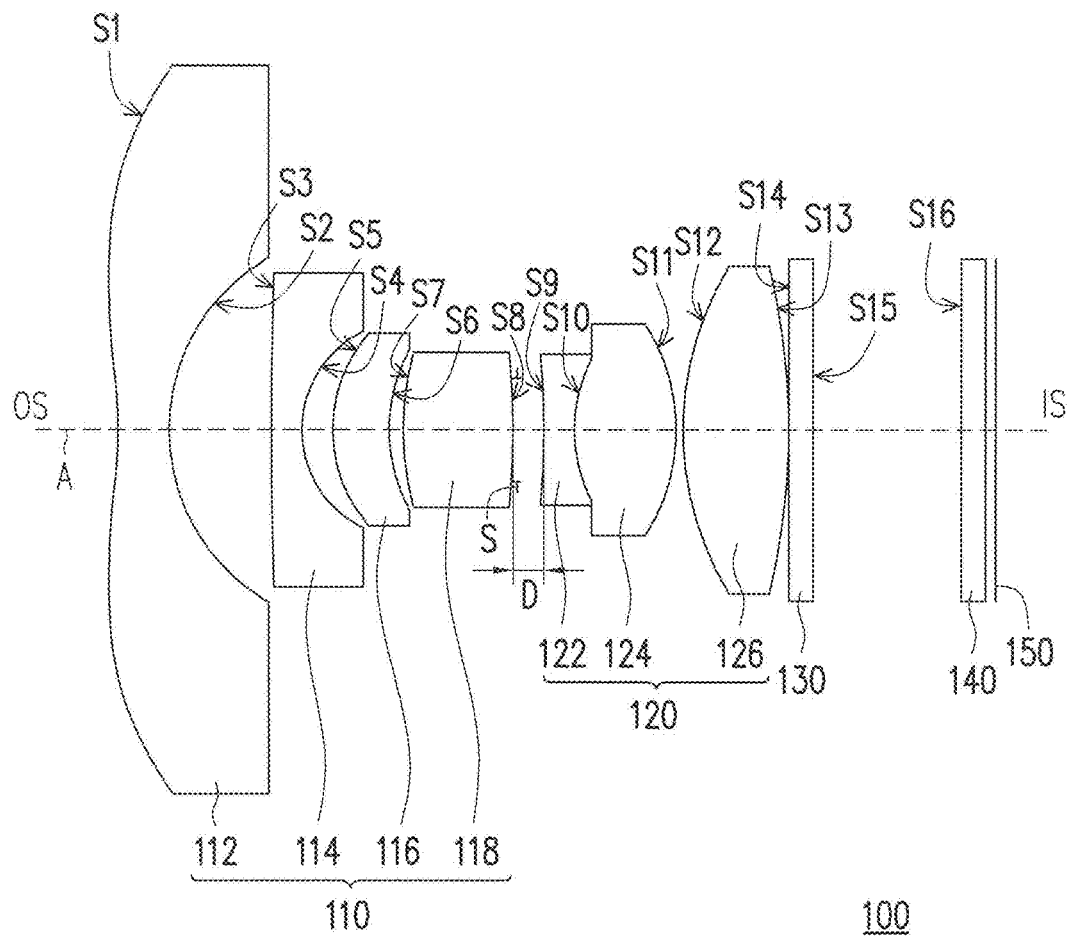
FIG. 1 is a schematic diagram of an optical lens according to an embodiment of the invention.

FIG. 1 is a schematic diagram of an optical lens according to an embodiment of the invention. Referring to FIG. 1, the optical lens 100 of the present embodiment is located between a magnified side OS and a minified side IS. The optical lens 100 includes a first lens group 110, a second lens group 120, an infrared filter 130 and a glass cover 140. The first lens group 110 is arranged between the magnified side OS and the second lens group 120. The second lens group 120 is arranged between the first lens group 110 and the minified side IS, an aperture S is arranged between the first lens group 110 and the second lens group 120, and the first lens group 110 and the second lens group 120 are arranged along an optical axis A of the optical lens 100. In the present embodiment, a distance D between the first lens group 110 and the second lens group 120 on the optical axis A of the optical lens 100 is smaller than 0.7 millimeter.

In the present embodiment, the lens group 110 includes a first lens (L1) 112, a second lens (L2) 114, a third lens (L3) 116 and a fourth lens (L4) 118 sequentially arranged from the magnified side OS to the minified side IS, and refractive powers thereof are respectively negative, negative, positive and positive. The first lens 112 is a lens closest to the magnified side OS in the first lens group 110. The second lens group 120 includes a fifth lens (L5) 122, a sixth lens (L6) 124 and a seventh lens (L7) 126 sequentially arranged from the magnified side OS to the minified side IS, and refractive powers thereof are respectively negative, positive and positive. In the present embodiment, the first lens 112, the second lens 114, the third lens 116 and the seventh lens 126 are plastic lenses, and the fourth lens 118, the fifth lens 122, and the sixth lens 126 are glass lenses.

In the present embodiment, the first lens 112, the second lens 114, the third lens 116 and the seventh lens 226 are aspherical lenses. The first lens is a biconcave lens, and at least one surface of the first lens is an aspherical surface. In the present embodiment, two surfaces S1 and S2 of the first lens are aspherical surfaces. The surface S1 of the first lens 112 facing to the magnified side OS has an inflection property. As shown in FIG. 1, the surface S1 of the first lens 112 is an aspherical surface having at least one inflection point, and the inflection, for example, occurs where the curvature equals zero. In the present embodiment, a surface S3 of the second lens 114 facing to the magnified side OS is a convex surface. The third lens 116 is a concavo-convex lens. The fifth lens 122 and the sixth lens 124 construct a cemented lens for balancing chromatic aberration of the optical lens 100 including axial color and lateral color, but the arrangement purpose of the cemented lens is not intended to limit the invention.

In the present embodiment, a glass cover 140 and an image sensor can be set at the minified side IS, and the imaging plane thereof is indicated as 150. The glass cover 140 is arranged between the second lens group 120 and the imaging plane 150. An infrared filter 130 can be set between the seventh lens 126 and the glass cover 140. The optical lens 100 produces images on the imaging plane 150.

Specific data of each of the lenses in the optical lens 100 of FIG. 1 is listed in the following table 1.

TABLE ONE

| Surface No. | Radius of curvature (mm) | Gap (mm) | Refractive index | Abbe number | Remark |
|---|---|---|---|---|---|
| S1 | −10.925 | 0.954 | 1.531 | 55.754 | L1 |
| S2 | 3.454 | 1.863 | | | |
| S3 | 43.088 | 0.551 | 1.531 | 55.754 | L2 |
| S4 | 2.118 | 0.588 | | | |
| S5 | 2.731 | 1.013 | 1.636 | 23.972 | L3 |
| S6 | 3.285 | 0.227 | | | |
| S7 | 4.782 | 1.973 | 1.847 | 23.778 | L4 |
| S8 | −6.916 | 0.547 | | | |
| S9 | −8.900 | 0.612 | 1.923 | 18.897 | L5 |
| S10 | 3.500 | 1.819 | 1.697 | 55.532 | L6 |
| S11 | −3.912 | 0.118 | | | |
| S12 | 5.198 | 1.974 | 1.531 | 55.754 | L7 |
| S13 | −7.776 | 2.761 | | | |
| S14 | Infinity | 0.8 | 1.517 | 64.167 | |
| S15 | Infinity | 2.6 | | | |
| S16 | Infinity | 0.4 | 1.517 | 64.167 | |
| 150 | | | | | Imaging plane |

In the table 1, the gap refers to a straight-line distance between adjacent surfaces along the optical axis A. For example, a gap of the surface S1 refers to a straight-line distance between the surface S1 and the surface S2 along the optical axis A. The table 1 records thickness, refractive indexes and Abbe numbers of each of the lenses, and a remark column records the corresponding lenses. Moreover, in the table 1, the surfaces S1 and S2 are two surfaces of the first lens 112, the surfaces S3 and S4 are two surfaces of the second lens 114 et cetera. In the present embodiment, the surfaces S1 to S6, S12 and S13 are aspherical surfaces, which can be represented by the following equation (4):

$$Z = \frac{cr^2}{1 + \sqrt{1-(1+k)c^2 r^2}} + A_2 r^2 + A_4 r^4 + A_6 r^6 + A_8 r^8 + A_{10} r^{10} + A_{12} r^{12} + \ldots \quad (4)$$

In the equation (4), Z is a sag along the direction of the optical axis A, c is a reciprocal of a radius of an osculating sphere, i.e., a reciprocal of the radius of curvature close to the optical axis A (for example, the radius of curvature of the surfaces S1 to S6 and S12 to S13. k is a conic coefficient, r is a height of the aspherical surface, i.e., a height from a lens center to a lens edge, and $A_2$, $A_4$, $A_6$, $A_8$, $A_{10}$, and $A_{12}$ ... are aspheric coefficients, and in the present embodiment, the aspheric coefficients $A_2$ and the conic coefficient k is 0. The following table 2 lists parameter values of the surfaces S1 to S6 and S12 to S13.

TABLE 2

| | $A_4$ | $A_6$ | $A_8$ | $A_{10}$ | $A_{12}$ |
|---|---|---|---|---|---|
| S1 | 4.8636E−03 | −1.8355E−04 | 4.4088E−06 | −5.7877E−08 | 3.3790E−10 |
| S2 | −9.8072E−03 | 1.5879E−03 | −3.0966E−05 | −5.7476E−06 | 0 |
| S3 | 6.3618E−03 | −2.0731E−03 | 1.9281E−04 | −6.1805E−06 | 0 |
| S4 | 4.2738E−02 | −1.3721E−02 | 8.3572E−04 | 3.8572E−05 | 0 |
| S5 | 7.1455E−03 | −4.4218E−03 | 6.5133E−04 | −8.8262E−05 | 0 |
| S6 | −5.6176E−04 | 1.4672E−03 | −1.0803E−03 | 3.9596E−05 | 0 |
| S12 | −1.9814E−04 | −1.4252E−04 | 1.1859E−05 | −2.3742E−07 | 0 |
| S13 | 5.4287E−03 | −5.2974E−04 | 2.5065E−05 | −4.2085E−08 | 0 |

In the present embodiment, the optical lens 100 is complied with at least one of the following conditions (1) to (7):

0.53<EFL/IH<0.7      (1)

0.45<EFL/BFL<0.7      (2)

0.15<BFL/TTL<0.26      (3)

TTL<17 millimeters      (4)

FOV≥150 degrees      (5)

F≤2.8      (6)

CRA<12 degrees      (7)

where FOV is a field of view of the optical lens 100 or a maximum field of view, TTL is a total track length of the optical lens 100, which is a distance between the surface S1 of the first lens 112 and an imaging plane 150 of the optical lens at the minified side IS along the optical axis A, IH is an image height on the imaging plane 150 of the optical lens 100 at the minified side IS, F is a f-number, EFL is an effective focal length of the optical lens 100, BFL is a back focal length of the optical lens 110, which is a distance between a surface S13 of the seventh lens 126 and the imaging plane 150 of the optical lens 100 at the minified side IS along the optical axis A, and CRA is a chief ray angle of the optical lens 100. In this way, the optical lens 100 complied with at least one of the aforementioned conditions may have good optical imaging quality and good optical characteristics.

More specifically, in the optical lens 100 of the present embodiment, the F-number (Fno) is 2.0, the FOV is 160.2 degrees, and the total track length TTL is 15.8 millimeters. The effective focal length EFL is 1.80 millimeters, the image height on the imaging plane is 3.09 millimeters, and a ratio between the effective focal length and the image height on the imaging plane is EFL/IH=0.583. A ratio between the effective focal length and the back focal length is EFL/BFL=0.504. The chief ray angle CRA is 7.79 degrees.

It should be noticed that reference numbers of the components and a part of contents of the aforementioned embodiment are also used in the following embodiment, where the same reference numbers denote the same or like components, and descriptions of the same technical contents are omitted. The aforementioned embodiment can be referred for descriptions of the omitted parts, and detailed descriptions thereof are not repeated in the following embodiment.

Figure 5:
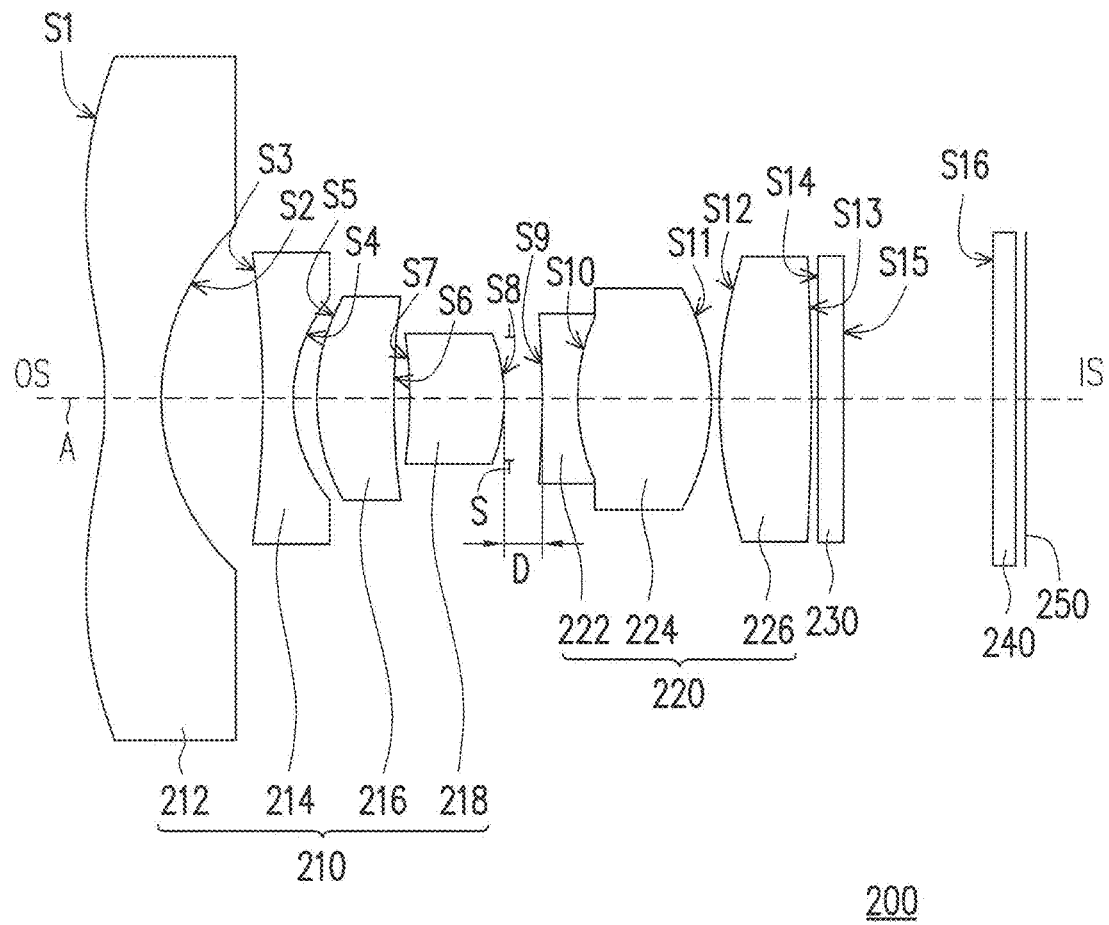
FIG. 5 is a schematic diagram of an optical lens according to another embodiment of the invention.

FIG. 5 is a schematic diagram of an optical lens according to another embodiment of the invention. Referring to FIG. 1 and FIG. 5, a main difference between the optical lens 200 of the present embodiment and the optical lens 100 is that a surface S3 of the second lens 214 facing to the magnified side OS is a concave surface.

Specific data of each of the lenses in the optical lens 200 of FIG. 5 is listed in the following table 3.

TABLE 3

| Surface No. | Radius of curvature (mm) | Gap (mm) | Refractive index | Abbe number | Remark |
|---|---|---|---|---|---|
| S1 | −7.197 | 1.000 | 1.525 | 56.282 | L1 |
| S2 | 3.378 | 1.754 | | | |
| S3 | −6.312 | 0.550 | 1.525 | 56.282 | L2 |
| S4 | 16.978 | 0.413 | | | |
| S5 | 4.690 | 1.334 | 1.636 | 23.972 | L3 |
| S6 | 35.398 | 0.236 | | | |
| S7 | −14.353 | 1.614 | 1.847 | 23.778 | L4 |
| S8 | −3.719 | 0.685 | | | |
| S9 | −11.729 | 0.600 | 1.923 | 18.897 | L5 |
| S10 | 3.300 | 2.357 | 1.697 | 55.532 | L6 |
| S11 | −3.617 | 0.100 | | | |
| S12 | 6.402 | 1.593 | 1.525 | 56.282 | L7 |
| S13 | −44.653 | 0.160 | | | |
| S14 | Infinity | 0.4 | 1.517 | 64.167 | |
| S15 | Infinity | 2.6 | | | |
| S16 | Infinity | 0.4 | 1.517 | 64.167 | |
| 250 | | | | | Imaging plane |

Interpretation of various optical parameters and data in the table 3 may refer to related description of the table 1. In the present embodiment, the surfaces S1 to S6, S12 and S13 are aspherical surfaces, which can be represented by the aforementioned equation (4). The following table 4 lists parameter values of the surfaces S1 to S6 and S12 to S13. In the present embodiment, the coefficient $A_2$ is 0.

According to the above description, in the optical lens 200 of the present embodiment, the F-number (Fno) is 2.0, the FOV is 150 degrees, and the total track length TTL is 16.5 millimeters. The effective focal length EFL is 1.94 millimeters, the image height on the imaging plane is 2.84 millimeters, and a ratio between the effective focal length and the image height on the imaging plane is EFL/IH=0.683. A ratio between the effective focal length and the back focal length is EFL/BFL=0.544. The chief ray angle CRA is 7.79 degrees.

Figure 2:
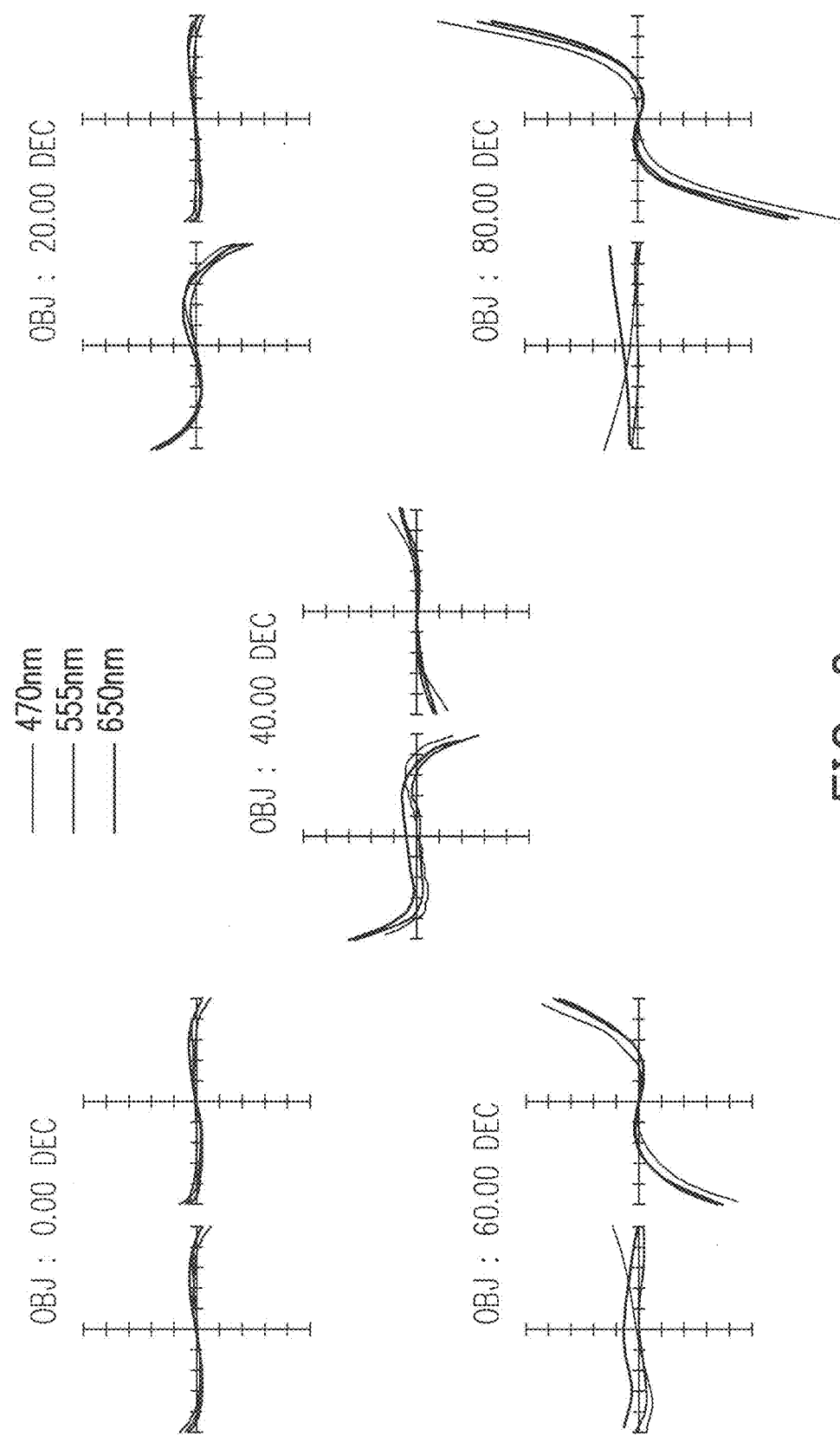
FIG. 2 to FIG. 4 are imaging optical simulation data plots of the optical lens of FIG. 1.
Figure 3:
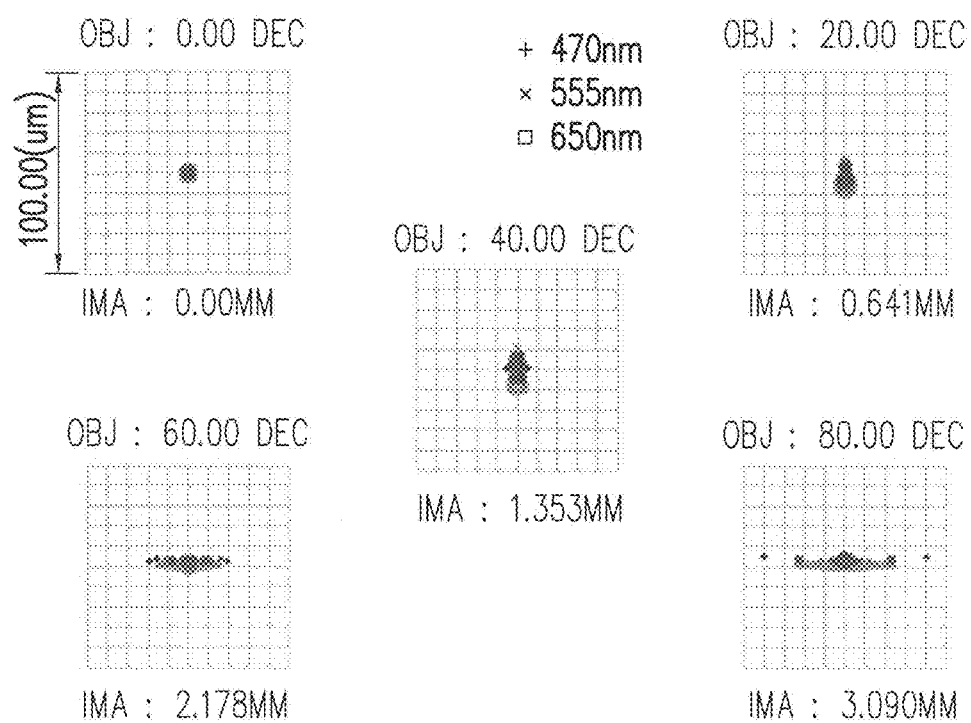
Figure 4:
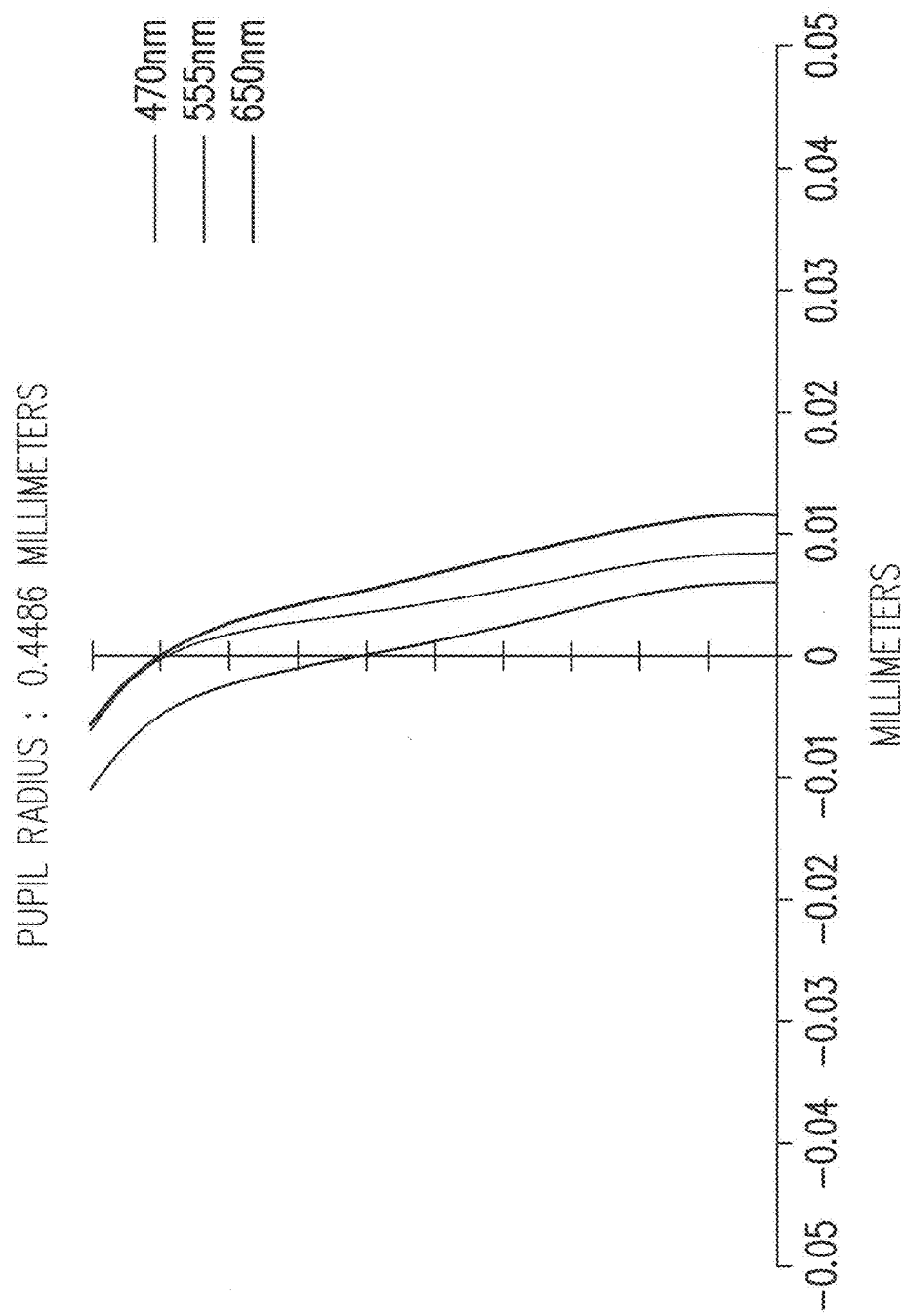
Figure 6:
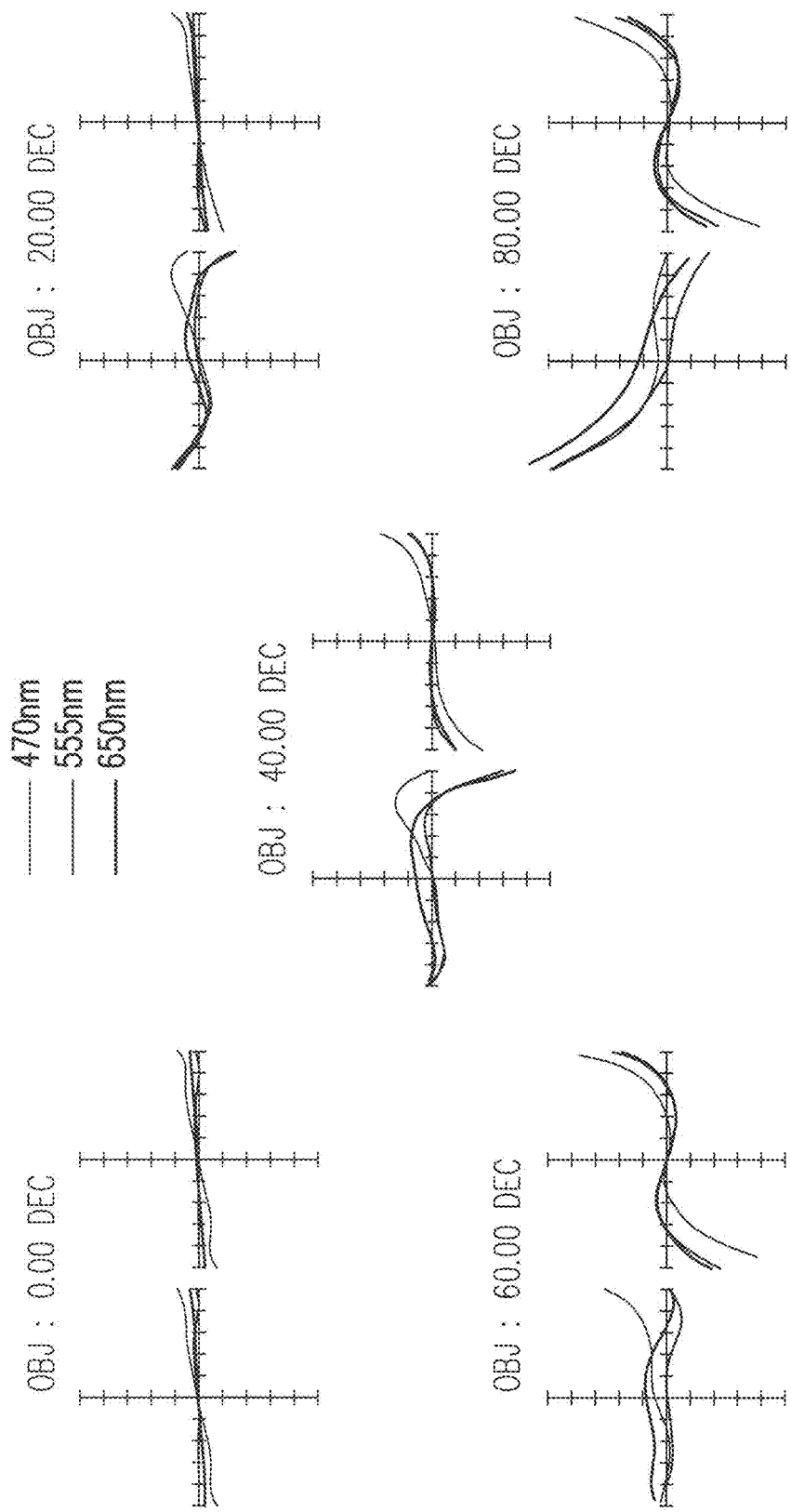
FIG. 6 to FIG. 8 are imaging optical simulation data plots of the optical lens of FIG. 5.
Figure 7:
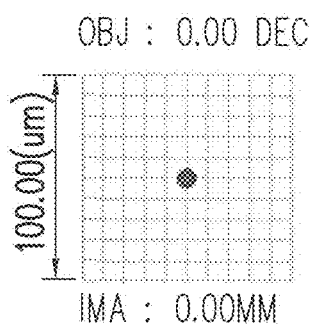
Figure 7:
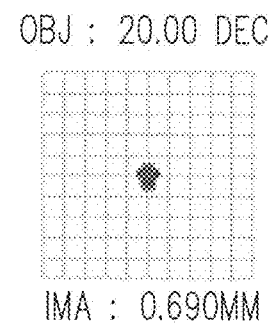
Figure 7:
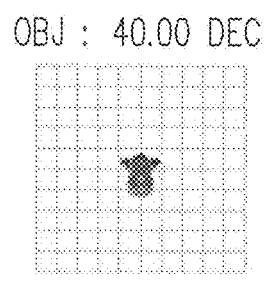
Figure 7:
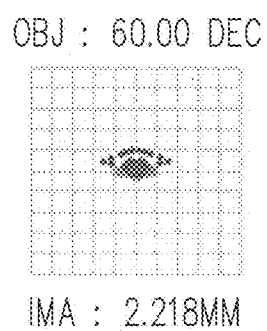
Figure 7:
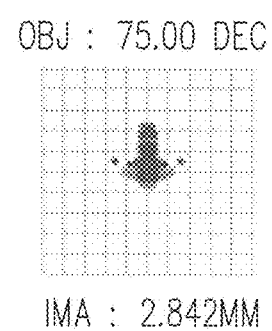
Figure 8:
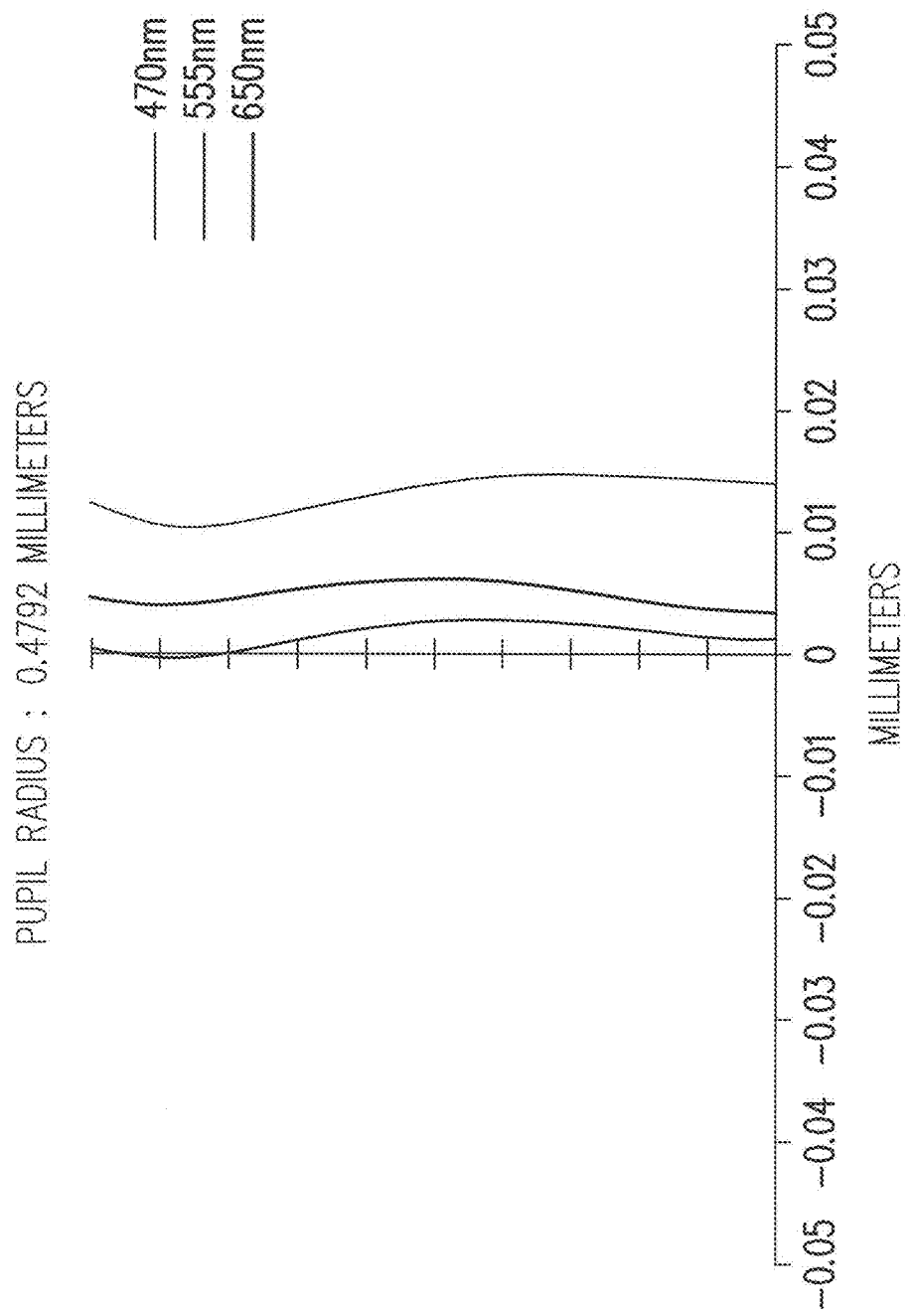

FIG. 2 to FIG. 4 and FIG. 6 to FIG. 8 are imaging optical simulation data plots of the optical lenses of FIG. 1 and FIG. 5, where FIG. 2 and FIG. 6 are transverse ray fan plots, in which an X-axis represents positions where lights passes through the aperture S, and a Y-axis represents positions where the lights are projected on the imaging plane (for example, the imaging plane 150 or 250). A color light with a red light with a wavelength of 650 nanometers (nm), a green light with a wavelength of 550 nm, and a blue light with a wavelength of 470 nm are taken as reference wavebands to perform simulation. FIG. 3 and FIG. 7 are spot diagrams simulated by the red light with the wavelength of 650 nm, the green light with the wavelength of 550 nm, and the blue light with the wavelength of 470 nm. FIG. 4 and FIG. 8 respectively illustrate field curvatures are simulated by the red light with the wavelength of 650 nm, the green light with the wavelength of 550 nm, and the blue light with the wavelength of 470 nm. Since the diagrams of the aforementioned figures are all within a standard range, the optical lens 100 and 200 of the embodiments may provide good imaging quality under conditions of a wide FOV, miniaturization, a thinning appearance, a high resolution, a short TTL, a large aperture, a low distortion, etc.

In summary, in the embodiments of the invention, the design of the optical lens is complied with the predetermined conditions and standards, so that the optical lens of the embodiments may provide good imaging quality under conditions of a wide FOV, miniaturization, a thinning appearance, a high resolution, a short TTL, a large aperture, a low distortion, etc.

It will be apparent to those skilled in the art that various modifications and variations can be made to the structure of the embodiments without departing from the scope or spirit of the invention. In view of the foregoing, it is intended that the invention cover modifications and variations of this invention provided they fall within the scope of the following claims and their equivalents.

What is claimed is:

1. An optical lens, comprising:
   a first lens group, arranged between a magnified side and a minified side, and comprising at least a first lens, a second lens, a third lens and a fourth lens sequentially arranged from the magnified side to the minified side, wherein the first lens is a lens of the first lens group

TABLE 4

| | k | $A_4$ | $A_6$ | $A_8$ | $A_{10}$ | $A_{12}$ |
|---|---|---|---|---|---|---|
| S1 | 0 | 5.4698E−03 | −1.7776E−04 | 4.3759E−06 | −6.0374E−08 | 4.1562E−10 |
| S2 | 0 | −2.1379E−02 | 2.7285E−03 | −1.2935E−04 | 5.4697E−07 | 1.3570E−10 |
| S3 | 2.37061789 | 2.2603E−02 | −3.5598E−03 | 3.0887E−04 | −8.3077E−06 | 9.9753E−09 |
| S4 | 21.10491474 | 1.0533E−01 | −2.0386E−02 | −1.6181E−04 | 3.1738E−04 | −4.1357E−08 |
| S5 | 3.152173374 | 4.3596E−02 | −1.9481E−02 | 3.3988E−03 | −4.8219E−04 | 4.9754E−07 |
| S6 | 98.98992138 | 1.7986E−02 | −4.3751E−03 | 1.6230E−03 | −5.2264E−04 | 2.7538E−07 |
| S12 | −0.101293929 | 1.4683E−03 | −1.0365E−03 | 1.4882E−04 | −6.2329E−06 | −4.5682E−09 |
| S13 | −98.98823176 | 6.0123E−03 | −1.9094E−03 | 1.9656E−04 | −6.4506E−06 | 7.6247E−10 | closest to the magnified side, the first lens is a biconcave lens, and at least one surface of the first lens is an aspherical surface; and a second lens group, arranged between the first lens group and the minified side, and comprising at least a fifth lens, a sixth lens, and a seventh lens sequentially arranged from the magnified side to the minified side; and wherein the optical lens is complied with a condition of $0.53<EFL/IH<0.7$, where EFL is an effective focal length of the optical lens, and IH is an image height of the optical lens on an imaging plane at the minified side;

wherein the seventh lens having no inflection point on an optical surface thereof, wherein the optical lens comprises at least one spherical lens with refractive power.

2. The optical lens as claimed in claim 1, wherein the optical lens is complied with a condition of $0.45<EFL/BFL<0.7$, where BFL is a back focal length of the optical lens.

3. The optical lens as claimed in claim 1, wherein the optical lens is complied with a condition of $0.15<BFL/TTL<0.26$, where BFL is a back focal length of the optical lens, and TTL is a total track length of the optical lens.

4. The optical lens as claimed in claim 1, wherein the optical lens is complied with a condition of TTL<17 millimeters, where TTL is a total track length of the optical lens, the seventh lens is positive powered.

5. The optical lens as claimed in claim 1, wherein the optical lens is complied with a condition of $F≤2.0$, where F is f-number.

6. The optical lens as claimed in claim 1, wherein the optical lens is complied with a condition of CRA<12 degrees, where CRA is a chief ray angle of the optical lens.

7. The optical lens as claimed in claim 1, wherein a surface of the first lens facing to the magnified side has an inflection property, the third lens is a biconvex lens or a concavo-convex lens, and a refractive power of the third lens is positive.

8. The optical lens as claimed in claim 1, wherein the fifth lens and the sixth lens form a cemented lens.

9. The optical lens as claimed in claim 1, wherein a distance between the first lens group and the second lens group on an optical axis of the optical lens is smaller than 0.7 millimeter.

10. The optical lens as claimed in claim 1, wherein the optical lens is complied with conditions of $FOV≥150$ degrees.

11. The optical lens as claimed in claim 1, further comprising an aperture, disposed between the first lens group and the second lens group.

12. The optical lens as claimed in claim 11, wherein, the optical lens comprises no more than 7 lenses having refractive power;
wherein the optical lens is complied with conditions of $FOV≥150$ degrees;
wherein a surface of the first lens facing to the magnified side has an inflection property;
wherein the second lens group comprises a cemented lens.

13. The optical lens as claimed in claim 11, wherein, the optical lens comprises at least 3 lenses formed of plastic and at least 3 lenses formed of glass.

14. The optical lens as claimed in claim 13, wherein, the at least three lenses formed of plastic are aspherical lens.

15. The optical lens as claimed in claim 14, wherein, the fifth lens and the sixth lens are both formed of glass and form a cemented lens.

16. The optical lens as claimed in claim 11, wherein:
the first lens is an aspherical lens formed of plastic;
the second lens is an aspherical lens formed of plastic;
the third lens is an aspherical lens formed of plastic;
the fourth lens is a spherical lens formed of glass;
the fifth lens is a spherical lens formed of glass;
the sixth lens is a spherical lens formed of glass; and
the seventh lens is an aspherical lens formed of plastic.

17. The optical lens as claimed in claim 11, wherein the optical lens comprises a lens having both refractive index of larger than 1.9 and Abbe number smaller than 20.

18. The optical lens as claimed in claim 11, wherein the optical lens having at least three lenses formed of same material having same refractive index and Abbe number.

19. An optical lens, comprising:
a first lens group, arranged between a magnified side and a minified side, and comprising at least a first lens, a second lens, a third lens and a fourth lens sequentially arranged from the magnified side to the minified side, wherein the first lens is a lens of the first lens group closest to the magnified side, the first lens is a biconcave lens, and at least one surface of the first lens is an aspherical surface;

a second lens group, arranged between the first lens group and the minified side, and comprising at least a fifth lens, a sixth lens, and a seventh lens sequentially arranged from the magnified side to the minified side; and an aperture, disposed between the first lens group and the second lens group, wherein the optical lens is complied with a condition of $0.53<EFL/IH<0.7$, where EFL is an effective focal length of the optical lens, and IH is an image height of the optical lens on an imaging plane at the minified side, and wherein:
the first lens having refractive power of negative;
the second lens having refractive power of negative;
the third lens having refractive power of positive;
the fourth lens having refractive power of positive;
the fifth lens having refractive power of negative; and
the sixth lens having refractive power of positive.

20. An optical lens, comprising:
a first lens group, arranged between a magnified side and a minified side, and comprising at least a first lens, a second lens, a third lens and a fourth lens sequentially arranged from the magnified side to the minified side, wherein the first lens is a lens of the first lens group closest to the magnified side, the first lens is a biconcave lens, and at least one surface of the first lens is an aspherical surface;

a second lens group, arranged between the first lens group and the minified side, and comprising at least a fifth lens, a sixth lens, and a seventh lens sequentially arranged from the magnified side to the minified side, and an aperture, disposed between the first lens group and the second lens group, wherein the optical lens is complied with a condition of $0.53<EFL/IH<0.7$, where EFL is an effective focal length of the optical lens, and IH is an image height of the optical lens on an imaging plane at the minified side, wherein the optical lens comprises at least 3 lenses formed of plastic and at least 3 lenses formed of glass,
wherein the at least three lenses formed of plastic are aspherical lens, and
wherein the at least three lenses formed of glass are spherical lens.

* * * * *